United States Patent [19]

West

[11] 4,222,646
[45] Sep. 16, 1980

[54] PRIME FOCUS CAMERA FOR TELESCOPE

[76] Inventor: Robert D. West, 1031 Hanshaw Rd., Ithaca, N.Y. 14850

[21] Appl. No.: 44,258

[22] Filed: May 31, 1979

[51] Int. Cl.³ .................... G02B 23/00; G03B 17/48
[52] U.S. Cl. ........................................ 354/79; 350/19
[58] Field of Search ............... 354/79, 75, 76; 350/18, 350/19, 81; 346/107; 352/131

[56] References Cited

U.S. PATENT DOCUMENTS

| | | | |
|---|---|---|---|
| 2,651,969 | 9/1953 | Thor | 350/18 X |
| 2,937,584 | 5/1960 | Gesualdi | 350/18 X |
| 2,960,018 | 11/1960 | Bills | 354/79 |

Primary Examiner—L. T. Hix
Assistant Examiner—Shelley Wade
Attorney, Agent, or Firm—Bruns & Jenney

[57] ABSTRACT

A simple camera for use in a telescope having a hollow support cylinder that is capable of being slipped into the focus mount tube of the instrument for mounting and positioning the camera in reference to the image plane of the telescope. The cylinder depends from the base of the camera and encloses an aperture formed in the base so that the telescope image is allowed to pass directly into the camera. The main housing of the camera is pivotably supported on the base and contains a plurality of film-holding compartments that can be selectively moved over the aperture to expose the film contained therein whereby a number of exposures can be made without having to reload the camera. A viewing window is further provided in the housing that is also capable of being positioned over the aperture to permit visual observation of the image without having to remove the camera from the instrument.

14 Claims, 7 Drawing Figures

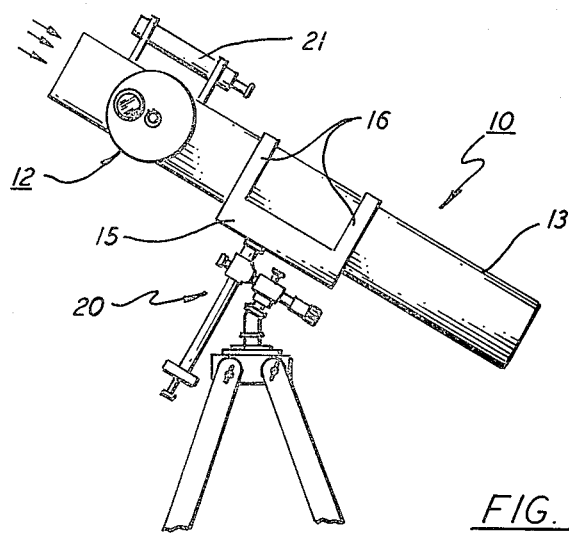
FIG. 1
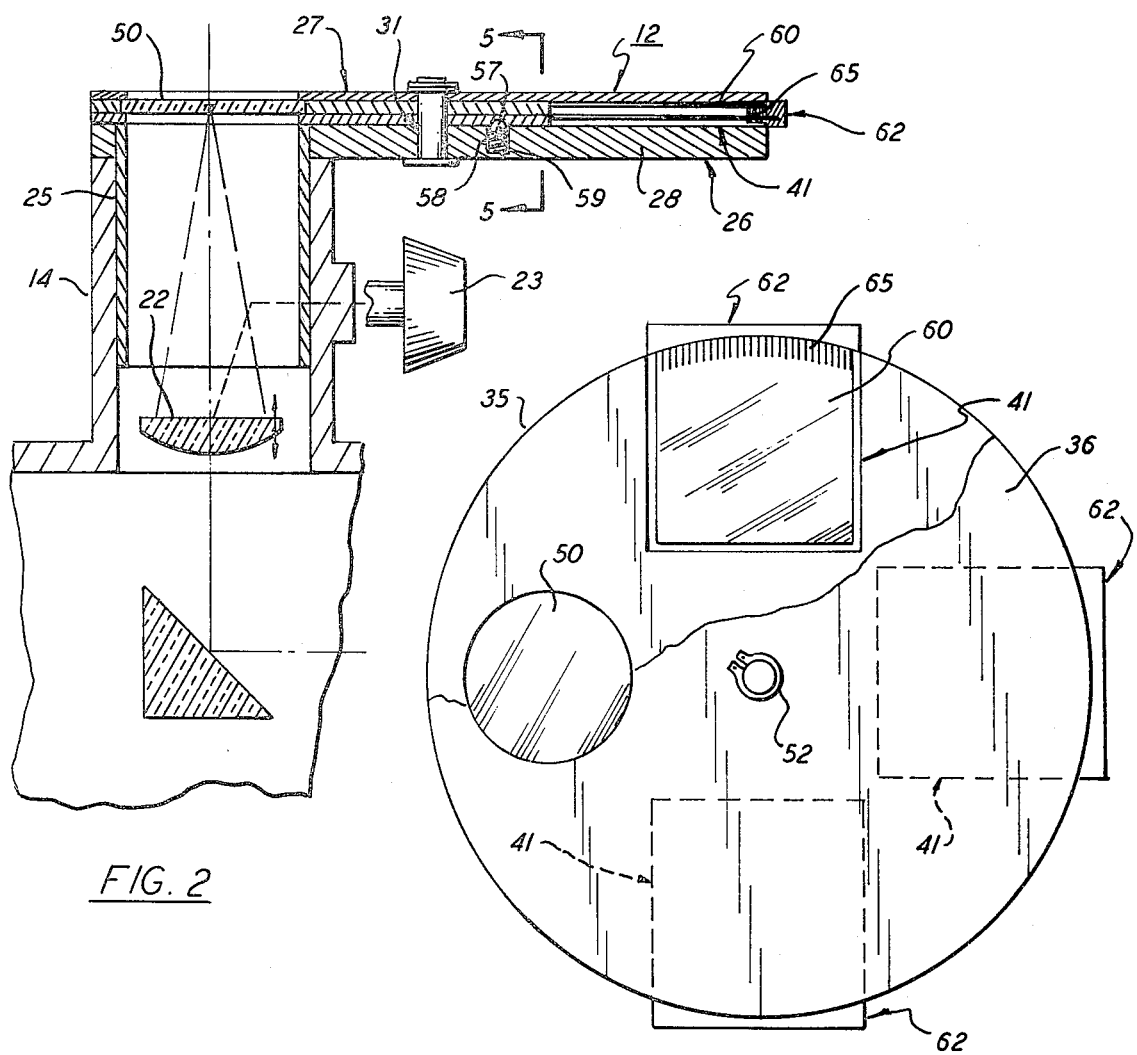
FIG. 2
FIG. 3

PRIME FOCUS CAMERA FOR TELESCOPE

BACKGROUND OF THE INVENTION

This invention relates to a simple and inexpensive camera that is suitable for use in conjunction with a telescope and, in particular, to a simple camera that is capable of making multiple time exposures without having to be reloaded.

Most cameras that are available for use in conjunction with a telescope are relatively complex and expensive devices which, in most cases, require special mounting fixtures and/or reworking of the instrument to enable the camera to be properly positioned thereupon. As a consequence, the average amateur astronomer, who might otherwise wish to record his celestial observations upon film, finds that he cannot afford to do so. The cruder, less expensive, cameras which are available are equally difficult to mount upon the telescope, are generally hard to place in focus, and typically provide for only one exposure at a time before the camera must be reloaded.

SUMMARY OF THE INVENTION

It is therefore an object of the present invention to provide an improved camera for use in conjunction with a telescope.

A further object of the present invention is to provide a camera that can be easily and simply mounted upon a telescope.

A still further object of the present invention is to provide a camera that can be mounted upon a telescope without the need of special mounting brackets or reworking of the instrument.

Another object of the present invention is to provide a telescope camera that is simple and inexpensive to construct and which is capable of producing a plurality of exposures without the necessity of reloading between each exposure.

These and other objects of the present invention are attained by means of a camera having a hollow mounting cylinder that is capable of being slidably received within the focus mount tube of the telescope, a base plate that is affixed to the mounting cylinder containing a clear aperture that is coaxially aligned with the cylinder to permit the telescope image to freely pass therethrough, a housing pivotally mounted upon the base plate that includes a plurality of film-holding compartments that can be selectively positioned over the aperture to expose the film contained therein and a viewing window that can also be similarly positioned over the aperture to permit the telescope-generated image to be viewed therethrough.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a side elevation of a telescope containing the apparatus of the present invention;

FIG. 2 is an enlarged, partial side elevation in section showing the camera of the present invention mounted within the focus mount tube of the instrument;

FIG. 3 is a top view of the camera with portions broken away to further illustrate the film-holding compartments contained therein;

DETAILED DESCRIPTION OF THE INVENTION

Figure 5:
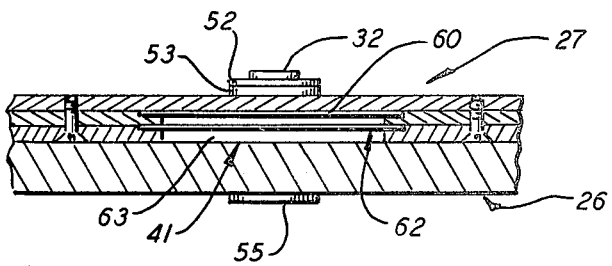
FIG. 5 is a partial section view taken along lines 5—5 in FIG. 2.

Referring initially to FIGS. 1 and 2, there is shown a telescope, generally referenced 10, of the type typically used by amateur astronomers or the like to view celestial bodies. Although the camera of the present invention may be used in association with a number of different type instruments, it is herein shown mounted upon a Newtonian telescope. Basically, the Newtonian telescope is a reflecting instrument that is arranged to allow the light from an observed body to enter the open end of its barrel 13. The light image passes down the barrel to the opposite end thereof where it strikes a parabolic light-gathering mirror (not shown). The image is compacted by the parabolic mirror and reflected back up the barrel onto a prism 11 or a plano mirror which turns the image 90° from the optical axis of the telescope and directs it out of the instrument through focus mount tube 14. Normally, the prime focal plane or imaging plane of the system will lie just beyond the outer margin of the tube. An adjustable eyepiece, such as eyepiece 22, is sometimes positioned in the optical path to enable the image to be sharply focused in the image plane. Adjustment is achieved by turning adjustment knob 23 which, in turn, causes the relative position of the eyepiece to be changed in regard to the imaging plane.

In the present embodiment of the invention, the telescope barrel is secured within a cradle 15 by means of straps 16—16. The cradle is connected to a base in the form of tripod 17 using an equitorial mount 20. The mount affords two degrees of rotational motion to the barrel that is developed about a pair of perpendicular axes known as the polar axis and the declination axis. During set up, the polar axis is first placed in parallel alignment with the axis of the earth by sighting on the star Polaris and its angular relationship with the northern horizon then corrected for local latitude. With the polar axis so aligned, the instrument is aimed at a celestial body of interest by rotating the instrument about its declination axis.

The observed body can be held motionless in the object plane of the instrument by rotating the instrument about the polar axis at a speed equal to one revolution per day and in a direction that is opposite to that of the earth's direction of rotation. Although not shown, a drive means of the type known and used in the art can be connected to the instrument for automatically turning it about its polar axis at the noted speed. Accordingly, the instrument can be "locked" onto a star, galaxy or nebula and made to automatically track the body across the sky so long as it remains within the visual range of the instrument. By placing a film in the prime focal plane of the tracking telescope, a time exposure of the observed body can be made to provide clear sharp pictures thereof.

A small wide angle locating or finder scope 21 is mounted upon the barrel of the telescope to provide for general alignment of the telescope so as to position the body within the visual accommodation of the instrument. Final alignment and focusing of the image is made by sighting through the focus mount tube and adjusting the positioning of the eyepiece as noted above.

With further reference to the remaining figures, a camera 12 is therein illustrated that is capable of being quickly and simply mounted upon a telescope to enable a plurality of exposures to be made without having to reload the camera. The camera of the present invention is made up of three main components which include a mounting cylinder 25, a circular base 26 and a complimentary circular housing 27. In assembly, the base and the housing share a common axis 30 that forms the central axis of the camera. A pivot pin 31 is coaxially aligned along the central axis which rotatably supports the housing upon the top surface of the base.

Figure 4:
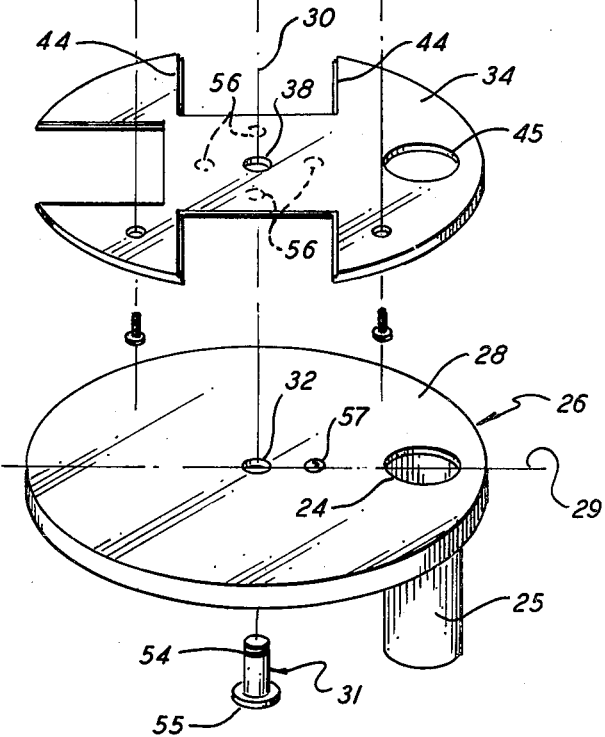
FIG. 4 is an exploded perspective view of the camera of the present invention showing the various components thereof.

The camera base comprises a flat plate 28 having a clear circular aperture 24 passing vertically therethrough. The aperture is centered upon a horizontal centerline 29 of the base with the center of the aperture being located a predetermined distance from the center of the plate. The mounting cylinder, which is a hollow tube, is placed in coaxial alignment with the clear aperture and is secured to the base by any suitable means whereby the cylinder depends as shown in FIG. 4 from the bottom surface of the base. As will be explained in further detail below, the cylinder and the aperture combine in assembly to furnish a light passage through which the telescope image enters the camera housing.

The camera housing is situated on top of the base plate and contains three film-holding compartments, generally referenced 41, and a viewing window 42. The compartments and the window are circumferentially spaced at 90° intervals about the housing and are positioned so that each may be centered over the clear aperture formed in the base plate as the housing is rotated about the pivot pin. In practice, the housing is formed by bringing together three flat circular sections that include a bottom section 34, an intermediate section 35 and a top or cover section 36. The sections are secured in a sandwich-like configuration by means of a pair of screws that are countersunk into the bottom section of the housing and threaded into the cover section thereof.

As best illustrated in FIG. 4, the film-holding compartments are formed by cutting radially extended rectangular shaped slots 37—37 into the sidewalls of the intermediate and bottom sections of the housing. Coaxially aligned holes 45-47 are also formed in each housing section that cooperate in in assembly to establish the viewing window. The shank of the pivot pin is press fitted into hole 30 provided in the base plate and the shank passed through central holes 38-40 formed in the housing sections. A close running fit is provided between the shank and the holes formed in the housing section so that the housing can turn freely about the pivot with a minimum amount of play. The head 55 of the pivot pin is seated against the bottom wall of the base plate while the top part of the shank is secured to the top wall of the housing by means of a snap ring 52. The snap ring is received within a groove 54 cut into the shank of the pivot pin and acts against a nylon bushing 53 to apply sufficent holding pressure against the housing to maintain the housing in close sliding relationship against the top surface of the base plate.

A detent mechanism is herein provided which acts between the housing and the base plate to allow selective indexing of the film-holding compartment and the viewing window over the clear aperture in the base plate and to securely hold the housing in the selected position. The detent includes a detent ball 57 that is mounted within a blind hole 58 formed in the top surface of the base plate. A spring 59 is mounted in the hole behind the ball and functions to urge the ball outwardly into an operative or stop position wherein a portion of the ball protrudes beyond the top of the base plate. The ball is centered upon the centerline 29 extending between the center of the plate and the center of the clear aperture. Four equally spaced semi-circular indentations 56—56 are formed in the bottom wall of the housing that are arranged to receive therein the protruding portion of the detent ball. The indentations are located 90° apart and are situated upon the radial centerlines of the three film-holding compartments and the viewing window. As a result of this construction, each of the compartments and the viewing window can be selectively indexed over the aperture to either expose the film contained in the compartments or provide a visual presentation of the image in the window.

Referring once again to FIG. 4, a ground glass element 50 is securely mounted within the hole 46 provided in the intermediate section of the housing. By design, the element will lie in the image plane of the telescope's optical system when the bottom of the base plate is seated upon the top surface of the focus mount tube. When the window is placed over the aperture, an image of the observed body will be presented upon the viewing element. The image can be brought into sharp focus by use of the eyepiece adjustment knob prior to exposing the film contained in the housing thereby assuring that clear photographs will be produced.

An upper guideway and a lower guideway are formed in the light entrance passage 63 of each film-holding compartment. The guideways are formed by machining recessed shoulders 43—43 along the top edges of the slots formed in the intermediate housing section and similar recessed shoulders 44—44 in the bottom section. When the sections are brought together in assembly as shown in FIGS. 4 and 5, the overlying structure of the housing closes shoulders to form the subject guideways.

The upper guideway is utilized to position film 70 within the compartment. As can be seen, this guideway is formed in the intermediate housing section and, again by design, is situated in the prime focus plane of the telescope when the camera is mounted as described in the focus mount tube. The lower guideway is employed to position a shutter 62 in the light entrance passage directly below the film.

Figure 6:
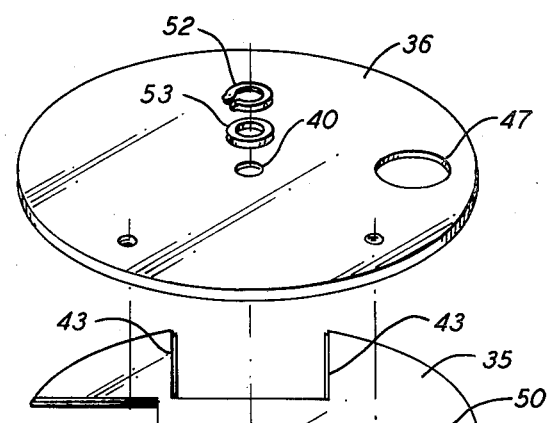
FIG. 6 is an enlarged, partial view in section showing the access opening to one of the film-holding compartments of the camera.
Figure 6:
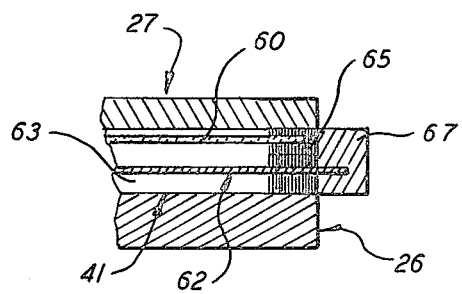

As illustrated in FIGS. 5-6 each film holding compartment passes outwardly through the side wall of the housing to provide an access opening 61. A penetratable light-tight seal 65 of any suitable design as known and used in the art is positioned in the opening to prevent ambient light from entering the compartment while, at the same time, permitting free movement of both the film and the shutter into and out of the compartment.

Figure 7:
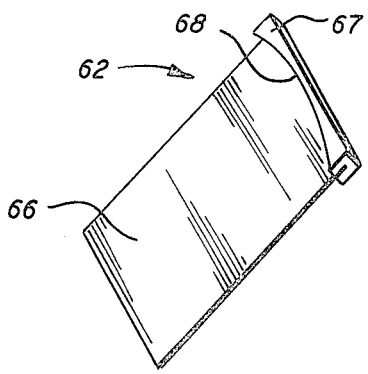
FIG. 7 is a perspective view of the manually-operated shutter employed in the present camera.

The shutter includes a rigid shade 66 that is connected to a handle 67 as illustrated in FIG. 7. The inner sidewall 68 of the handle is contoured to compliment the sidewall of the housing so that when the shade is positioned in a light blocking condition across the light entrance passage of the compartment, the handle will abut the sidewall of the housing. When the film 70 in the compartment is to be exposed, the shutter is simply removed from the housing through the access opening.

The camera, after it is loaded with film and the shutters placed in a light-blocking position, is mounted upon the telescope simply by inserting the mounting cylinder into the focus mount tube of the instrument and the base plate is bottomed thereagainst. The viewing window is then indexed over the aperture and the telescope adjusted to bring a sharp image of the body of interest into focus upon the ground glass contained in the window. As previously noted, this automatically brings the film strips mounted in the upper guideways of each compartment into the imaging plane of the telescope. The housing is now rotated to index a first film-holding compartment over the aperture. When the shutter is removed, the image is permitted to reach the film and exposure begins. The exposure is terminated after a desired length of time by simply replacing the shutter in the lower slide. The process is repeated for the remaining unexposed films. After all the film is exposed the camera is taken to a dark room and the film removed through the access opening. New film is loaded into the camera and the camera readied for reuse.

While this invention has been described with reference to the structure disclosed herein, it is not confined to the details set forth and this application is intended to cover any modifications or changes as may come within the scope of the following claims.

I claim:

1. A camera that is capable of being mounted within the focus mount tube of a telescope through which the telescopic image passes including
    a base plate having a clear aperture passing vertically therethrough,
    a hollow mounting cylinder depending downwardly from the bottom wall of the base plate, said cylinder being co-axially aligned with the aperture and being arranged to enclose the bottom entrance to the aperture therein, said cylinder being slidably received within the focus mount tube of the telescope whereby the telescopic image passes therethrough,
    a housing movably mounted over the base plate so that the image plane of the telescope lies within said housing, said housing containing at least one film-holding compartment for supporting film in the image plane of the telescope over an exposure passage that faces the base plate, and a viewing window passing vertically through the housing,
    positioning means extending between the base plate and the housing to permit the housing to be selectively positioned upon the base plate to place either the viewing window or the film-holding compartment over the aperture whereby the telescopic image is presented therein.

2. The camera of claim 1 that further includes an access opening which passes through the side wall of the housing and enters the exposure passage of said film-holding compartment, the access opening having a first guideway formed therein that is aligned within the image plane of the telescope for directing film into and out of the film-holding compartment.

3. The camera of claim 2 that further includes a second guideway formed in the access opening below the first guideway, and a shutter means slidably mounted within the second guideway that is arranged to close the exposure passage when placed in a first position.

4. The camera of claim 1 wherein said positioning means further includes a pivot pin that passes between the housing and the base plate about which the housing can be rotated.

5. The camera of claim 4 wherein the housing contains a plurality of film-holding compartments and which further includes a detent means acting between the base plate and the housing for indexing the film-holding compartments and the viewing window over the aperture.

6. The camera of claim 1 wherein said viewing window contains a ground optical element that is positioned in the image plane of the telescope.

7. In a telescope of the type wherein the telescopic image is directed through a focus mount tube onto an image plane, a camera for use in said telescope that includes
    a circular planar base plate having a radially offset clear aperture passing vertically therethrough,
    a mounting cylinder depending downwardly from the bottom surface of the base plate that is coaxially aligned with the aperture and which encloses the bottom entrance of the aperture therein, said cylinder being slidably received within the focus mount tube of the telescope to allow the telescopic image to pass therethrough,
    a circular housing that is pivotably mounted upon the base plate by means of a pivot pin that is aligned along the central axes of the plate and housing, said housing containing a plurality of circumferentially spaced film-holding compartments having exposure passages facing the base plate, and a viewing window passing vertically through the housing, said film-holding compartments and said viewing compartment being positioned within the housing so that each may be selectively positioned over the aperture within the image plane of the telescope.

8. The camera of claim 7 that further includes an indexing means acting between the base plate and the housing for accurately locating the selected compartment or window over the aperture.

9. The camera of claim 8 wherein said viewing window contains a ground optical element that lies within the image plane of the telescope.

10. The camera of claim 9 that further includes access openings which pass through the side wall of the housing and enter the exposure passage of each film-holding compartment, each access opening further containing a first guideway aligned within the image plane of the telescope for directing film into and out of said compartment.

11. The camera of claim 10 wherein said access opening includes a second guideway formed in the access opening below the first guideway, and a shutter means slidably mounted in the second guideway for closing the exposure passage to the compartment to light.

12. The camera of claim 11 that further includes a penetratable light-tight seal located at the entrance to each access opening.

13. The camera of claim 11 wherein the compartments and the viewing window are spaced at 90° intervals about the housing.

14. The camera of claim 7 wherein the outside diameter of the cylinder provides a close running fit with the inside diameter of the focus mount tube.

* * * * *